United States Patent
Jean et al.

(10) Patent No.: US 7,624,033 B1
(45) Date of Patent: Nov. 24, 2009

(54) PROCESSES AND SYSTEMS FOR MANAGING STATUS CHANGES TO WORK ORDERS

(75) Inventors: David R. Jean, Palo Alto, CA (US); Judy M. Marcopulos, Duluth, GA (US); Rita H. Scherer, Birmingham, AL (US)

(73) Assignee: AT&T Intellectual Property, I,L.P., Wilmington, DE (US)

( * ) Notice: Subject to any disclaimer, the term of this patent is extended or adjusted under 35 U.S.C. 154(b) by 1575 days.

(21) Appl. No.: 09/946,270

(22) Filed: Sep. 4, 2001
(Under 37 CFR 1.47)

(51) Int. Cl.
*G06F 17/60* (2006.01)
*H04M 1/24* (2006.01)

(52) U.S. Cl. .............. 705/7; 705/8; 705/11; 379/1.01; 379/9.02; 379/15.03; 379/29.01; 379/201.01

(58) Field of Classification Search .............. None
See application file for complete search history.

(56) References Cited

U.S. PATENT DOCUMENTS

| | | | |
|---|---|---|---|
| 4,464,543 A | 8/1984 | Kline et al. | |
| 5,093,794 A | 3/1992 | Howie et al. | |
| 5,155,761 A | 10/1992 | Hammond | 379/67 |
| 5,285,494 A | 2/1994 | Sprecher et al. | |
| 5,406,616 A | 4/1995 | Bjorndahl | 379/59 |
| 5,689,550 A | 11/1997 | Garson et al. | |
| 5,784,438 A | 7/1998 | Martinez | 379/89 |
| 5,790,633 A | 8/1998 | Kinser et al. | |
| 5,793,771 A | 8/1998 | Darland et al. | 370/467 |
| 5,893,906 A | 4/1999 | Daffin et al. | |
| 5,920,846 A * | 7/1999 | Storch et al. | 705/7 |
| 5,937,048 A | 8/1999 | Pelle | |
| 5,943,652 A * | 8/1999 | Sisley et al. | 705/9 |
| 5,946,372 A | 8/1999 | Jones et al. | |
| 5,946,373 A | 8/1999 | Harris | |
| 5,953,389 A | 9/1999 | Pruett et al. | |
| 5,956,024 A | 9/1999 | Strickland et al. | |

(Continued)

FOREIGN PATENT DOCUMENTS

EP 669586 A2 * 8/1995

OTHER PUBLICATIONS

Collins et al., "Automated Asignment and Scheduling of Service Personnel" IEEE Expert, vol. 9, No. 2, Apr. 1994, pp. 33-39.Apr.*

(Continued)

*Primary Examiner*—Albert DeCady
*Assistant Examiner*—Dave Robertson
(74) *Attorney, Agent, or Firm*—Cantor Colburn LLP

(57) ABSTRACT

Processes and systems are disclosed for managing status changes to a work order. One embodiment includes communicating with a communications network and receiving a change in status to the work order. The change in status is annotated with a date and a time, with the date and the time reflecting the local time zone of a telephone system wire center where the work order is locally managed. This embodiment validates that the annotated date and the time are chronologically after a previous change in status to the work order. The status of the work order is then updated. Each change in the status of the work order is date and time stamped as the work order progresses from creation to closure.

11 Claims, 11 Drawing Sheets

U.S. PATENT DOCUMENTS

| | | | |
|---|---|---|---|
| 6,006,171 | A | 12/1999 | Vines et al. |
| 6,018,567 | A | 1/2000 | Dulman |
| 6,032,039 | A | 2/2000 | Kaplan ..................... 455/413 |
| 6,173,047 | B1 | 1/2001 | Malik ......................... 379/207 |
| 6,175,859 | B1 | 1/2001 | Mohler ....................... 709/206 |
| 6,263,322 | B1 | 7/2001 | Kirkevold et al. |
| 6,289,382 | B1 | 9/2001 | Bowman-Amuah |
| 6,295,540 | B1 | 9/2001 | Sanschargrin et al. |
| 6,353,902 | B1 | 3/2002 | Kulatunge et al. |
| 6,356,928 | B1 | 3/2002 | Rochkind |
| 6,401,090 | B1 | 6/2002 | Bailis et al. |
| 6,445,774 | B1 | 9/2002 | Kidder et al. .............. 379/9.03 |
| 6,446,123 | B1 | 9/2002 | Ballantine et al. |
| 6,493,694 | B1 | 12/2002 | Xu et al. |
| 6,578,005 | B1* | 6/2003 | Lesaint et al. .................. 705/8 |
| 6,578,006 | B1* | 6/2003 | Saito et al. ...................... 705/9 |
| 6,614,882 | B1 | 9/2003 | Beamon et al. |
| 6,633,782 | B1 | 10/2003 | Schleiss et al. |
| 6,636,486 | B1 | 10/2003 | Magloughlin |
| 6,678,370 | B1 | 1/2004 | Freebersyser et al. |
| 6,788,765 | B1 | 9/2004 | Beamon |
| 6,845,148 | B1 | 1/2005 | Beamon |
| 6,870,900 | B1 | 3/2005 | Beamon |
| 6,937,993 | B1* | 8/2005 | Gabbita et al. ................. 705/8 |
| 6,990,458 | B2* | 1/2006 | Harrison et al. ................ 705/8 |
| 7,283,971 | B1* | 10/2007 | Levine et al. ................... 705/9 |
| 2001/0029504 | A1 | 10/2001 | O'Kane, Jr. et al. |
| 2002/0161731 | A1 | 10/2002 | Tayebnejad et al. |
| 2002/0168054 | A1 | 11/2002 | Klos et al. |
| 2003/0069797 | A1 | 4/2003 | Harrison |
| 2003/0187752 | A1 | 10/2003 | Kapiainen et al. |
| 2004/0022379 | A1 | 2/2004 | Klos et al. |
| 2004/0260668 | A1 | 12/2004 | Bradford |
| 2005/0015504 | A1* | 1/2005 | Dorne et al. ................. 709/229 |
| 2006/0050862 | A1* | 3/2006 | Shen et al. .................. 379/219 |

OTHER PUBLICATIONS

J.E. Collins and E.M. Sisley, "AI in Field Service; The Dispatch Advisor" in Workshop Notes, AI in Service and Support: Bridgine the Gap Between Research and Applications, 11th National Conf. on AI, Wash. DC., Jul. 11-15, 1993, pp. 26-37.*

E. Ghalichi and J. Collins, "The Dispatch Advisor-Merging Optimization and AI Technologies to Dispatch Service Technicians," in Proc. Workshop on AI for Customer Service & Support, 8th IEEE Conf. on AI Applications, Monterey, California, Mar. 3, 1992.*

Lesaint, D., C. Voudouris, and N. Azarmi. (2000). Dynamic Workforce Scheduling for British Telecommunications plc. Interfaces 30(1), 45-52.*

Lesaint, D., C. Voudouris, N. Azarmi, and B. Laithwaite. (1997). Dynamic Workforce Management. In Proceedings of the 1997 IEE Colloquium on AI for Network Management Systems, IEE Stevenage, UK, England, pp. 1/1-1/5.*

Lesaint, D., N. Azarmi, R. Laithwaite, and P. Walker. (1998). Engineering Dynamic Scheduler for Work Manager. BT Technology Journal 16(3), 16-29.*

Lesaint, D., Voudouris, C., Azarmi, N., Alletson, I. and Laithwaite, B. (2003). Field workforce scheduling. In BT Technology Journal, 21, Kluwer Academic Publishers, pp. 23-26.*

Software Systems for Telecommunications, Science and Technology Series, Bell Communications Research, Oct. 1992, [retrieved from application file U.S. Appl. No. 08/608,838], pp. 34-35, 52-55, 58, 59.*

Rey, R.F., Engineering and Operations in the Bell System, AT&T Bell Laboratories, Murray Hill, NJ, 1984, pp. 605-621.*

Garwood G J: 'Work Manager', BT Technol J, 15, No. 1, pp. 58-68 (1997).*

Collins, J.E.; Sisley, E.M., "Automated assignment and scheduling of service personnel," IEEE Expert, vol. 9, No. 2, pp. 33-39, Apr. 1994.*

Guido, B.; Roberto, G.; Di Tria, P.; Bisio, R., "Workforce management (WFM) issues," Network Operations and Management Symposium, 1998. NOMS 98., IEEE , vol. 2, no., pp. 473-482 vol. 2, 15-20.*

An Extensible Message Format for Message Disposition Notifications, R. Fajman, National Institutes of Health, Mar. 1998.

Impact Voice Mail Server Deluxe, Black Ice Software Inc., CTI Expo, Spring 1999.

BellSouth Memory Call VoiceMail Services, 1999.

Voice Profile for Internet Mail—Version 2, G. Vaudreuil—Lucent Technologies and G. Parsons—Northern Telecom, Sep. 1998.

IP Infrastructure: The Fastest Track for Tomorrow's Unified Communications, Arthur Rosenberg and David Zimmer, The Unified View, Oct. 2000.

TDB: Computerized Call Return Feature, IBM Technical Disclosure Bulletin, Apr. 1986.

US 6,826,262, 11/2004, Jean et al. (withdrawn)

* cited by examiner

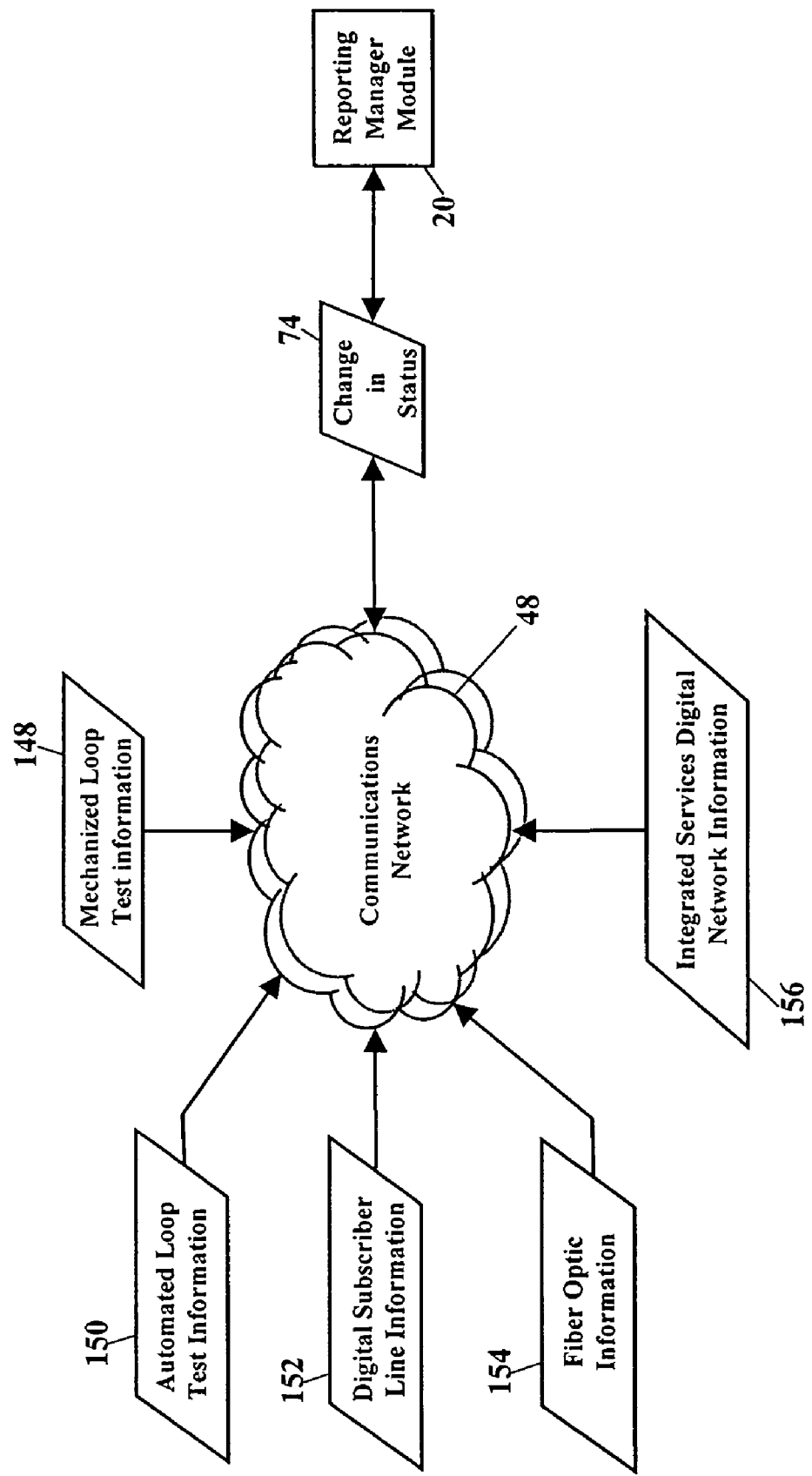

PROCESSES AND SYSTEMS FOR MANAGING STATUS CHANGES TO WORK ORDERS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to work order management systems and, more particularly, to processes and to systems for tracking, logging, and managing changes in status to a work order.

2. Description of the Related Art

Most residential and business telephone customers are connected to telephone systems by copper cables and wires. These copper cables are the familiar one or more telephone lines running throughout nearly every home in the United States. Because copper cable and wire connects each home, and many businesses, to the telephone system, the Public Switched Telephone Network is composed of billions of copper cables and wires. Each of these copper cables must be maintained to provide superior telephone service to the customer.

Because hundreds of work orders are generated each day, managers and governmental regulators often monitor the status of these work orders. The status of a work order indicates how, and what point, the work order has progressed from initial creation to final closure. The status of a work order, for example, indicates whether the work order has been assigned to a manual screening process, or whether the work order is currently being worked by a field technician. Managers and governmental regulators then use these changes in status to monitor how quickly customer problems are resolved and, thus, how well customers are satisfied.

These changes in status, however, are often inaccurately and incompletely tracked. Status changes are often miscoded and inaccurately reported. Human operators, for example, may incorrectly assign a technician dispatch status code when, in fact, the technician has already closed the work order. Human operators, too, are prone to inadvertent data entry errors. These errors often cascade throughout the status tracking system, creating an incomplete and inaccurate tracking history of the work order. Managers and regulators, therefore, have an inaccurate view of maintenance activities, an inaccurate measurement of maintenance goals, and an inaccurate measurement of customer service and satisfaction.

There is, accordingly, a need in the art for work order management systems that acquire fresh, up-to-date information, that automatically and accurately track the status of maintenance work orders, that reduce human error by automatically assigning status codes, that accurately and quickly reflect true management and regulatory objectives and goals, and that reduce the costs of maintaining operations.

BRIEF SUMMARY OF THE INVENTION

The aforementioned problems are reduced by a Status Manager module. The Status Manager module comprises processes and systems that track and log each change in status to a work order. The Status Manager module tracks every activity during the life of the work order. Whether the work order is assigned to a manual inspection process, or whether the work order passes to a dispatch status, the Status Manager module tracks this progress. If the work order is being worked by a technician, the Status Manager module would note the technician status and, also, date and time stamp the assignment. The Status Manager module tracks who has touched the work order, who has deferred action on the work order, who has referred the work order to another party or activity, who has transitioned the work order, and any other activity occurring during the life of the work order. The Status Manager module, therefore, tracks, brokers, and manages all the status details that occur as the work order progresses from creation to final closure.

The Status Manager module improves the efficiency of work order management. The Status Manager module tracks work order status changes using real-time, up-to-date information. The Status Manager module, therefore, offers managers a quick and accurate review of the status of pending work orders. Because the Status Manager module acquires real-time, up-to-date information, the Status Manager module accurately reflects the current state of work order activities and of the communication system. Because the Status Manager module tracks each change in status, the Status Manager module also ensures that the proper status codes are assigned to each activity. The Status Manager module, therefore, offers a complete history of each work order, from the initial problem complaint to the final closure.

The Status Manager module also helps achieve management goals and requirements. Because the Status Manager module acquires real-time, up-to-date information, managers have a real-time benchmark of their maintenance goals. Managers may immediately know the status of a work order, when the work order was initiated, and how long the work order has been open. This real-time information may be immediately compared to the goal. The Status Manager module also offers a real-time view of customer service efforts. Managers, and perhaps government regulators, may accurately view how quickly customer complaints are resolved and, thus, how satisfied customers are with their service or product. The Status Manager module, therefore, helps managers attain internal performance objectives and meet, or exceed, regulatory requirements.

BRIEF DESCRIPTION OF THE SEVERAL VIEWS OF THE DRAWINGS

These and other features, aspects, and advantages of the present invention are better understood when the following Detailed Description of the Invention is read with reference to the accompanying drawings, wherein:

FIGS. 10 and 11 are schematic drawings of a non-limiting example of the Status Manager module.

DETAILED DESCRIPTION OF THE INVENTION

Figure 1:
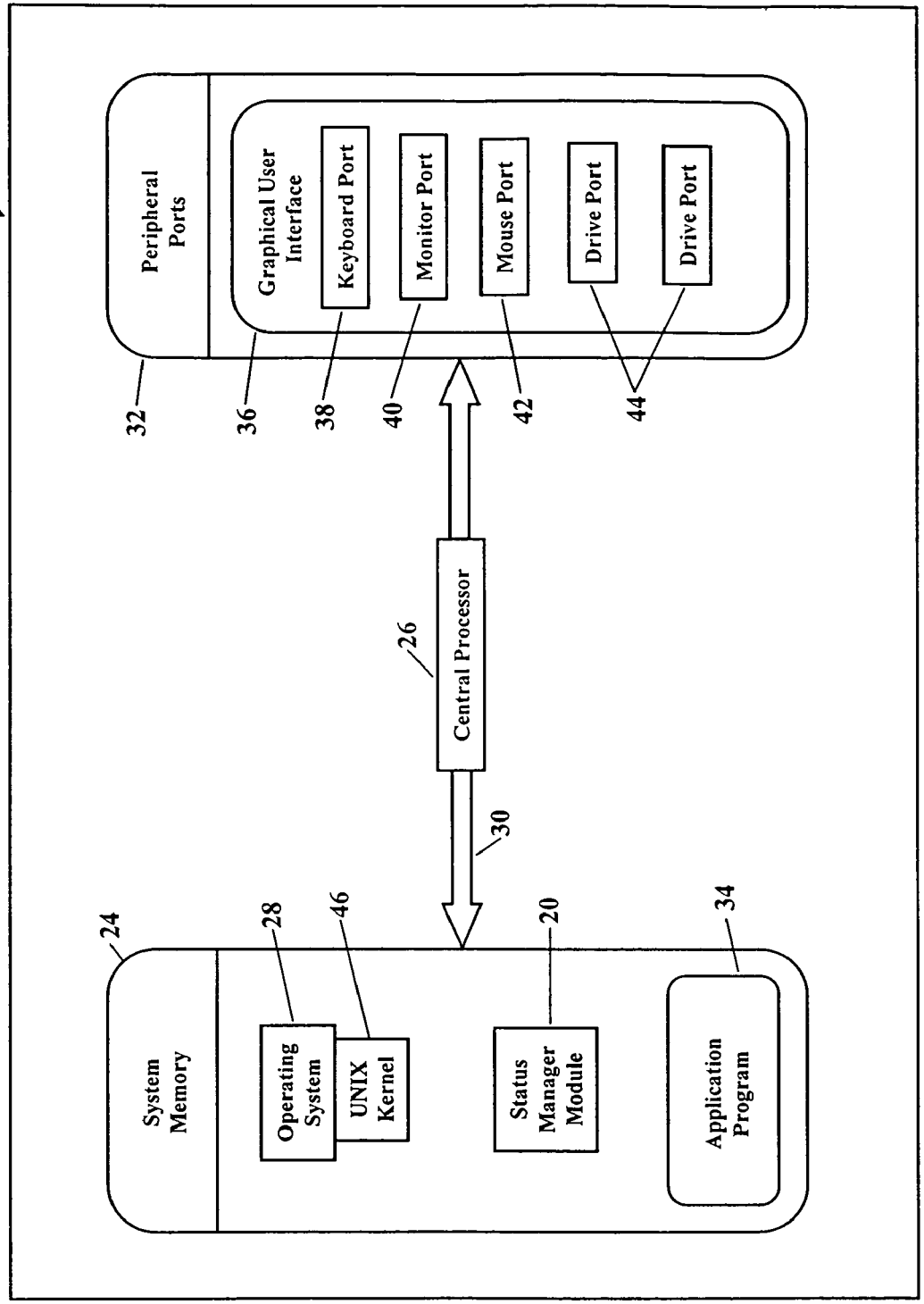
FIG. 1 is a schematic diagram showing a Status Manager module residing in a computer system.

The present invention particularly relates to processes and to systems for managing status changes to a work order. A "work order," as used herein, is information describing a maintenance task to be performed. One embodiment includes communicating with a communications network and receiving a change in status to the work order. The change in status is annotated with a date and a time, with the date and the time reflecting the local time zone of a telephone system wire center where the work order is locally managed. This embodiment validates that the annotated date and the time are chronologically after a previous change in status to the work order. The status of the work order is then updated. Each change in the status of the work order, therefore, is date and time stamped as the work order progresses from creation to closure.

An alternative embodiment describes a process of managing status changes to a work order. This alternative embodiment communicates with a communications network and receives a change in status for the work order. The process requests that the change in status be annotated with a date and a time. The date and the time reflects the local time zone of a telephone system wire center where the work order is locally managed. A validation is then requested, the validation requiring that the annotated date and the time be chronologically after a previous change in status. Once the time and date are chronologically validated, the process requests that the work order be updated with the change in status. Each change in status, therefore, is date and time stamped as the work order progresses from creation to closure.

A further embodiment describes a process of managing status changes to a work order. Here the embodiment communicates with a communications network and acquires a telephone line record. The telephone line record comprises at least one of i) customer information from a Customer Record Information System, ii) facility information from a Loop Facility Assignment Control System, and iii) equipment information from a TELCORDIA™ SWITCH system. The work order is created using information from the acquired telephone line record. Each change in status to the work order is archived as the work order progresses from creation to closure. Each change in status is annotated with a date and a time, where the date and the time reflects the local time zone of a telephone system wire center where the work order is locally managed. The process validates that the annotated date and the time are chronologically after a previous change in status to the work order. The work order is then updated with the change in status. Each change in status in the life of the work order, therefore, is tracked and logged for management, reporting, and auditing activities.

A system is also disclosed for managing status changes to a work order. The system has a Status Manager module and a processor. The Status Manager module acquires a change in status to the work order and annotates the change in status with a date and a time. The date and the time reflects the local time zone of a telephone system wire center where the work order is locally managed. The Status Manager module validates that the annotated date and the time are chronologically after a previous change in status to the work order. The processor is capable of annotating, validating, and tracking each change in status as the work order progresses from creation to closure.

An alternative embodiment of a system manages status changes to a work order. This alternative embodiment has the Status Manager module and a processor. The Status Manager module acquires a telephone line record, with the telephone line record comprising at least one of i) customer information from a Customer Record Information System, ii) facility information from a Loop Facility Assignment Control System, and iii) equipment information from a TELCORDIA™ SWITCH system. The work order is created using information from the acquired telephone line record. The Status Manager module also archives each change in status to the work order as the work order progresses from creation to closure. Each change in status is annotated with a date and a time, with the date and the time reflecting the local time zone of a telephone system wire center where the work order is locally managed. The Status Manager module validates that the annotated date and the time are chronologically after a previous change in status to the work order. The work order is then updated with the change in status. The processor is capable of annotating, validating, and tracking each change in status as the work order progresses from creation to closure. Each change in status in the life of the work order, therefore, is tracked and logged for management, reporting, and auditing activities.

A computer program product is also disclosed. The computer program product manages status changes to a work order. The computer program product has a computer-readable medium and a Status Manager module stored on the computer-readable medium. The Status Manager module acquires a change in status to the work order and annotates the change in status with a date and a time. The date and the time reflect the local time zone of a telephone system wire center where the work order is locally managed. The Status Manager module validates that the annotated date and the time are chronologically after a previous change in status to the work order.

An alternate computer program product is disclosed for managing status changes to a work order. The computer program product again includes a computer-readable medium and a Status Manager module stored on the computer-readable medium. The Status Manager module acquires a telephone line record, with the telephone line record comprising at least one of i) customer information from a Customer Record Information System, ii) facility information from a Loop Facility Assignment Control System, and iii) equipment information from a TELCORDIA™ SWITCH system. The work order is created using information from the acquired telephone line record. Each change in status to the work order is archived as the work order progresses from creation to closure. Each change in status is annotated with a date and a time, where the date and the time reflect the local time zone of a telephone system wire center where the work order is locally managed. The Status Manager module validates that the annotated date and the time are chronologically after a previous change in status to the work order. The work order is then updated with the change in status.

Figure 2:
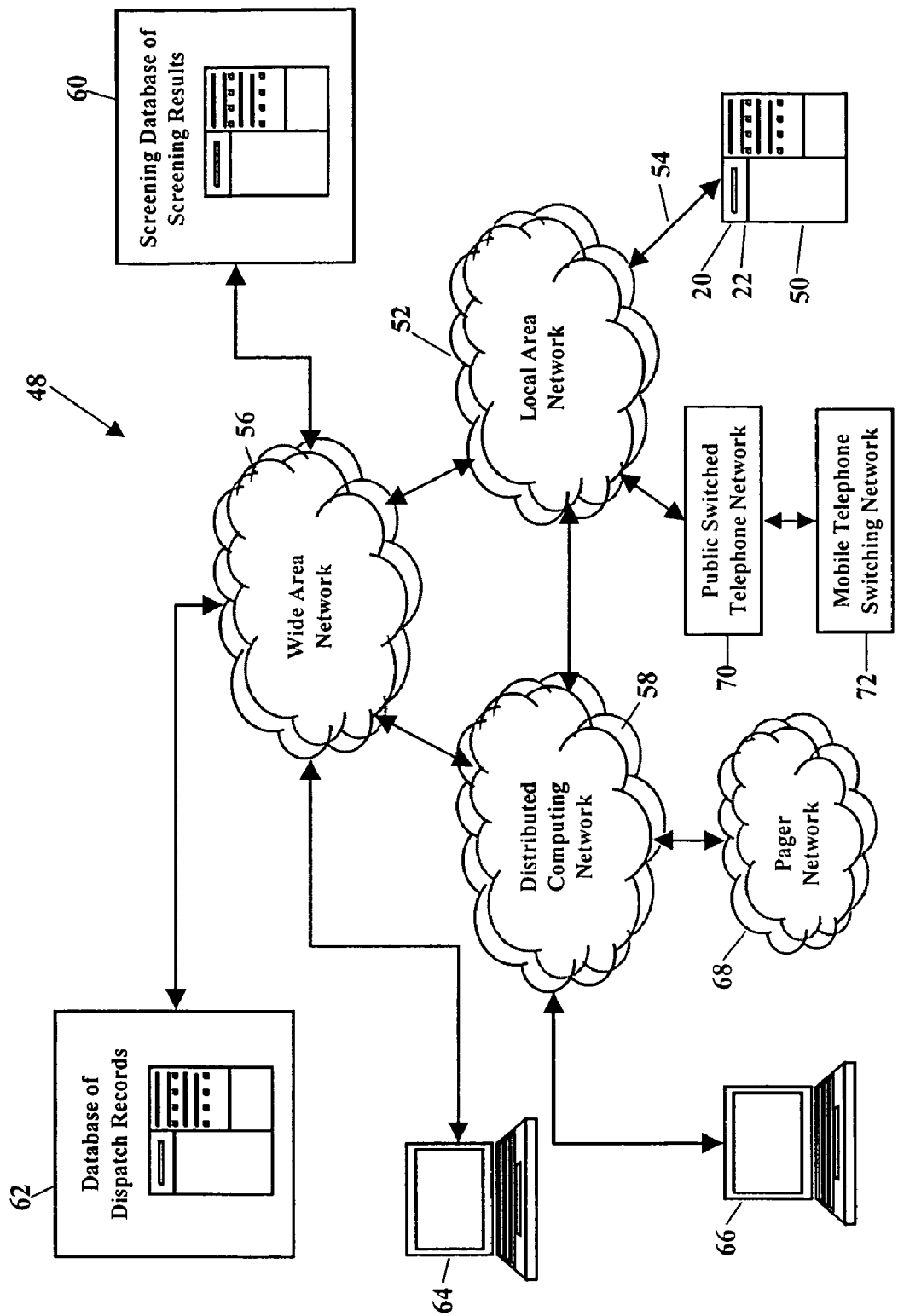
FIG. 2 is a schematic diagram of a communications network representing an operating environment for the Status Manager module.

FIGS. 1 and 2 depict a possible operating environment for an embodiment of the present invention. This embodiment of a Status Manager module 20 comprises a computer program that manages status changes to work orders. As those of ordinary skill in the art of computer programming recognize, computer processes/programs are depicted as process and symbolic representations of computer operations. Computer components, such as a central processor, memory devices, and display devices, execute these computer operations. The computer operations include manipulation of data bits by the central processor, and the memory devices maintain the data bits in data structures. The process and symbolic representations are understood, by those skilled in the art of computer programming, to convey the discoveries in the art.

FIG. 1 is a schematic diagram showing the Status Manager module 20 residing in a computer system 22. The Status Manager module 20 operates within a system memory device 24. The computer system 22 also has a central processor 26 executing an operating system 28. The operating system 28, as is well known, has a set of instructions that control the internal functions of the computer system 22. A system bus 30 communicates signals, such as data signals, control signals, and address signals, between the central processor 26, the system memory device 24, and at least one peripheral port 32. Those of ordinary skill in the art understand that the program, processes, methods, and systems described in this patent are not limited to any particular computer system or computer hardware.

Those of ordinary skill in the art also understand the central processor 26 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). While only one microprocessor is shown, those skilled in the art also recognize multiple processors may be utilized. Those skilled in the art further understand that the program, processes, methods, and systems described in this patent are not limited to any particular manufacturer's central processor.

The preferred operating system 28 is the UNIX® operating system (UNIX®) is a registered trademark of the Open Source Group, www.opensource.org). Those skilled in the art also recognize many other operating systems are suitable. Other suitable operating systems include UNIX-based Linux, WINDOWS NT® (WINDOWS NT® is a registered trademark of Microsoft Corporation, One Microsoft Way, Redmond WA 98052-6399, 425.882.8080, www.Microsoft.com), and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory 24 may also contain an application program 34. The application program 34 cooperates with the operating system 28 and with the at least one peripheral port 32 to provide a Graphical User Interface (GUI) 36. The Graphical User Interface 36 is typically a combination of signals communicated along a keyboard port 38, a monitor port 40, a mouse port 42, and one or more drive ports 44. As those of ordinary skill well understand, a kernel portion 46 of the preferred UNIX® operating system 28 manages the interface between the application program 34, the input/output devices (the keyboard port 38, the monitor port 40, the mouse port 42, or the drive ports 44), the system memory 24, and the scheduling and maintenance of the file access system 20.

FIG. 2 is a schematic diagram of a communications network 48. This communications network 48 further represents an operating environment for the Status Manager module 20. The Status Manager module 20 resides within the memory storage device (shown as reference numeral 24 in FIG. 1) in the computer system 22. The computer system 22 is conveniently shown as a computer server 50, however, the Status Manager module 20 may reside in any computer system. The computer server 50 communicates with a Local Area Network (LAN) 52 along one or more data communication lines 54. As those of ordinary skill in the art understand, the Local Area Network 52 is a grid of communication lines through which information is shared between multiple nodes. These multiple nodes are conventionally described as network computers. As those of ordinary skill in the art also recognize, the Local Area Network 52 may itself communicate with a Wide Area Network (WAN) 56 and with a globally-distributed computing network 58 (e.g. the "Internet"). The communications network 48 allows the Status Manager module 20 to request and acquire information from many computers connected to the Local Area Network 52, the Wide Area Network 56, and the globally-distributed computing network 58.

As FIG. 2 shows, the Status Manager module 20 sends and receives information to/from many other computers connected to the communications network 48. The Status Manager module 20, as described above, tracks every activity in the life of a work order, as the work order progresses from creation to final closure. The Status Manager module 20, for example, may acquire a change in status from a screening database 60. As the work order progresses from creation to closure, the work order may be screened for attributes that help resolve the problem. The results of these screening activities may be stored in the screening database 60. The Status Manager module 20 may also acquire a change in status from a database 62 of dispatch records. The database 62 of dispatch records could indicate what technician has been assigned the work order and how many hours are estimated for the repair. The Status Manager module 20 may also receive a change in status from a user at a user computer 64. A field technician, for example, could interface with the Status Manager module 20 and update the status of the work order. FIG. 2 even shows that remote users, such as programmers and engineers, may use a computer 66 to access the communications network 48 and to remotely access the Status Manager module 20. Because many computers may be connected to the communications network 48, computers and computer users may share and communicate a vast amount of information.

FIG. 2 also shows the communications network 48 may include infrastructure for mobile, wireless devices. The communications network 48, for example, could include a pager network 68. The pager network 68 would permit the Status Manager module 20 to send a page notification when a certain change in status is detected. A Public Switched Telephone Network 70, and a mobile telephone switching network 72, permits the Status Manager module 20 to send a call notification when a certain change in status is detected. The communications network 48 would also inherently permit an email notification.

Figure 3:
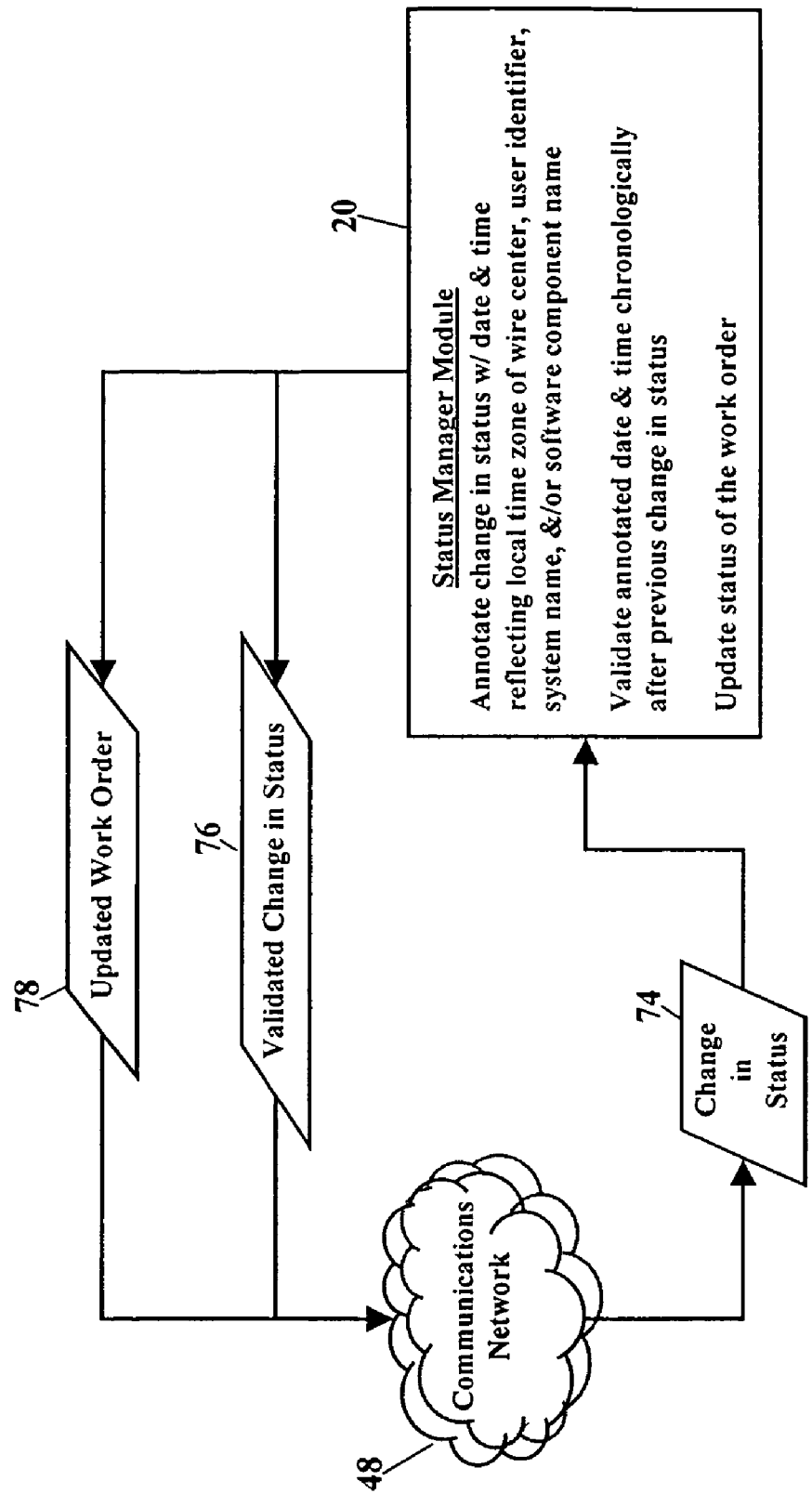
FIG. 3 is a schematic drawing of one embodiment of the Status Manager module.

FIG. 3 is a schematic drawing of one embodiment of the Status Manager module 20. The Status Manager module 20 communicates with the communications network 48 and receives a change in status 74 to a work order. The Status Manager module 20 annotates the change in status 74 with a date and a time. The date and the time reflect the local time zone of a telephone system wire center where the work order is locally managed. This embodiment validates that the annotated date and the time are chronologically after a previous change in status to the work order. The status of the work order is then updated. The Status Manager module 20 may then communicate a validated change in status 76 to the communications network 48 for distribution to client systems and users. The Status Manager module 20 could also communicate an updated work order 78 to the communications network 48. The updated work order 78 could reflect the validated change in status 76.

The Status Manager module 20 could also annotate other information. The Status Manager module 20, for example, may annotate the change in status 74 with a user identifier. The user identifier could represent a user generating the change in status 74 to the work order. The Status Manager module 20 could also annotate the change in status 74 with a system name. The system name could represent a system generating the change in status 74 to the work order. A software component name could also be annotated, where the software component name could represent a computer software component generating the change in status 74 to the work order. These annotations would further allow the Status Manager module 20 to track and log each change in status during the life of the work order.

The annotated date and time reflect the local time zone of a wire center. As this patent application further explains, the Status Manager module 20 may be running on a computer in a different time zone from where the work order is being managed. Each work order is locally handled and managed by a geographic turf. A "turf" is a telephone system wire center, or a collection of wire centers, for a geographic segment. The geographic turf could include organizing one or more wire centers by region, by state, by area, by district, by general manager, and/or by manager. A turf, therefore, could span several states. The Status Manager module 20, however, may be installed and running at a data center that is remote from the turf. The data center could be in one time zone, while the geographic turf falls within a different time zone. The turf, in fact, could span several states and lie within multiple time zones. Because the local time zone of the Status Manager module 20 may not accurately reflect the time zone of the geographic turf, the Status Manager module 20, instead, maps the change in status 74 to a local wire center managing the work order. The Status Manager module 20 acknowledges the local time zone of the wire center that is responsible for the work order. The Status Manager module 20, therefore, records all status times, dispatch times, and any other event postings according to the local time zone of the wire center managing the work order.

The wire center itself may have a geographic component. The wire center could be defined as a geographical area within a construction management center. The wire center could also be defined as a geographical area served by a distributing frame. The wire center could also reflect a geographical area served by a telephone switch and/or a geographical area served by a central office. Because the turf and the wire center may each describe a geographic segment, the Status Manager module 20 should annotate the date and time according to the local time zone.

Figure 4:
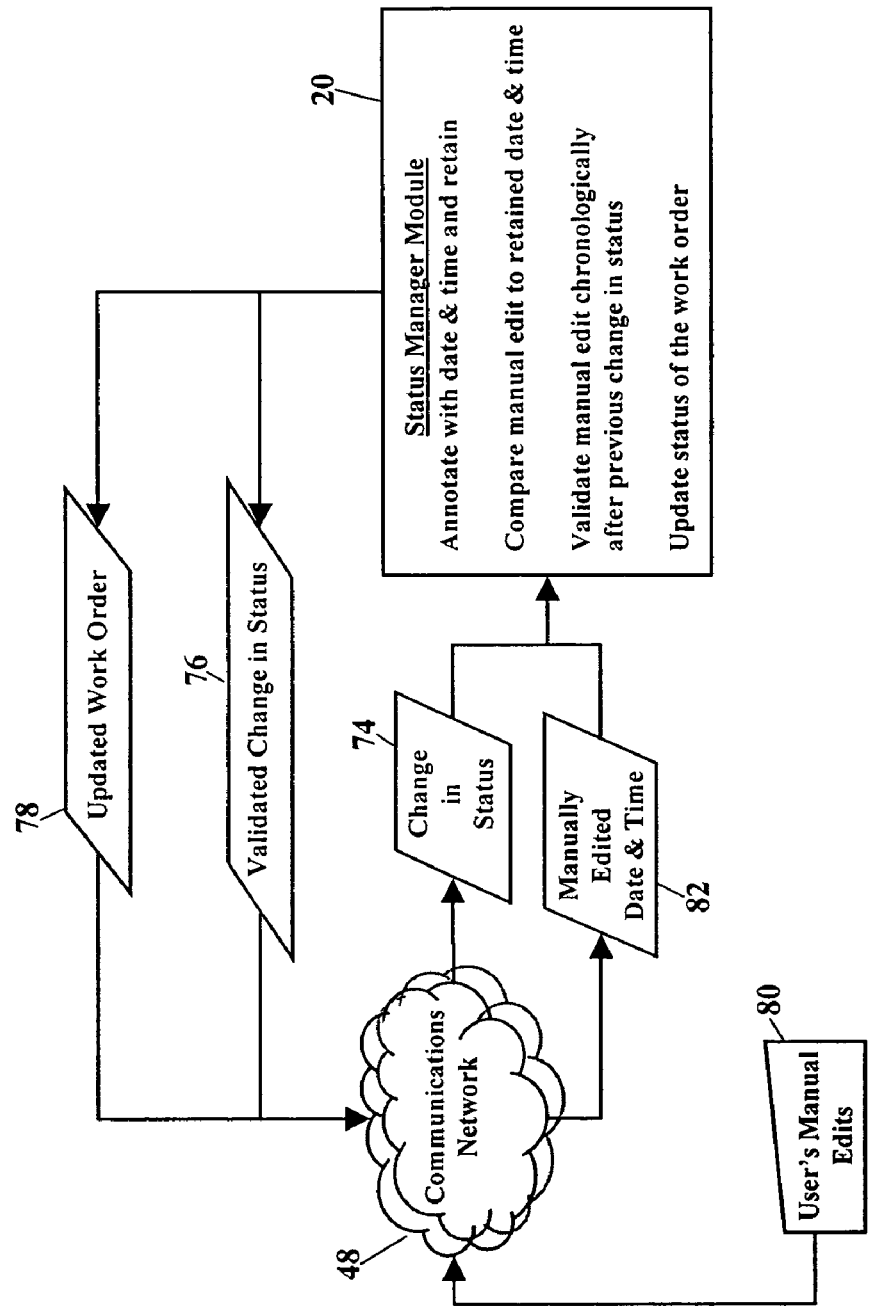
FIG. 4 is a schematic drawing of another embodiment of the Status Manager module.

FIG. 4 is a schematic drawing of another embodiment of the Status Manager module 20. The Status Manager module 20 communicates with the communications network 48, receives the change in status 74, and annotates the change in status 74 with the date and time. Here, however, the Status Manager module 20 accepts a user's manual edits 80. A technician, for example, may complete a work order, however, not electronically close the work order for several minutes or for even several hours. The Status Manager module 20 could accept manually edited date and time information 82 in order to backdate the change in status 74. The Status Manager module 20, however, should still retain the initially-annotated date and time as a separate entity. The manually edited date and time information 82 should be compared to the initially-annotated date and time to validate that the user's manual edit is chronologically after a previous change in status to the work order.

Figure 5:
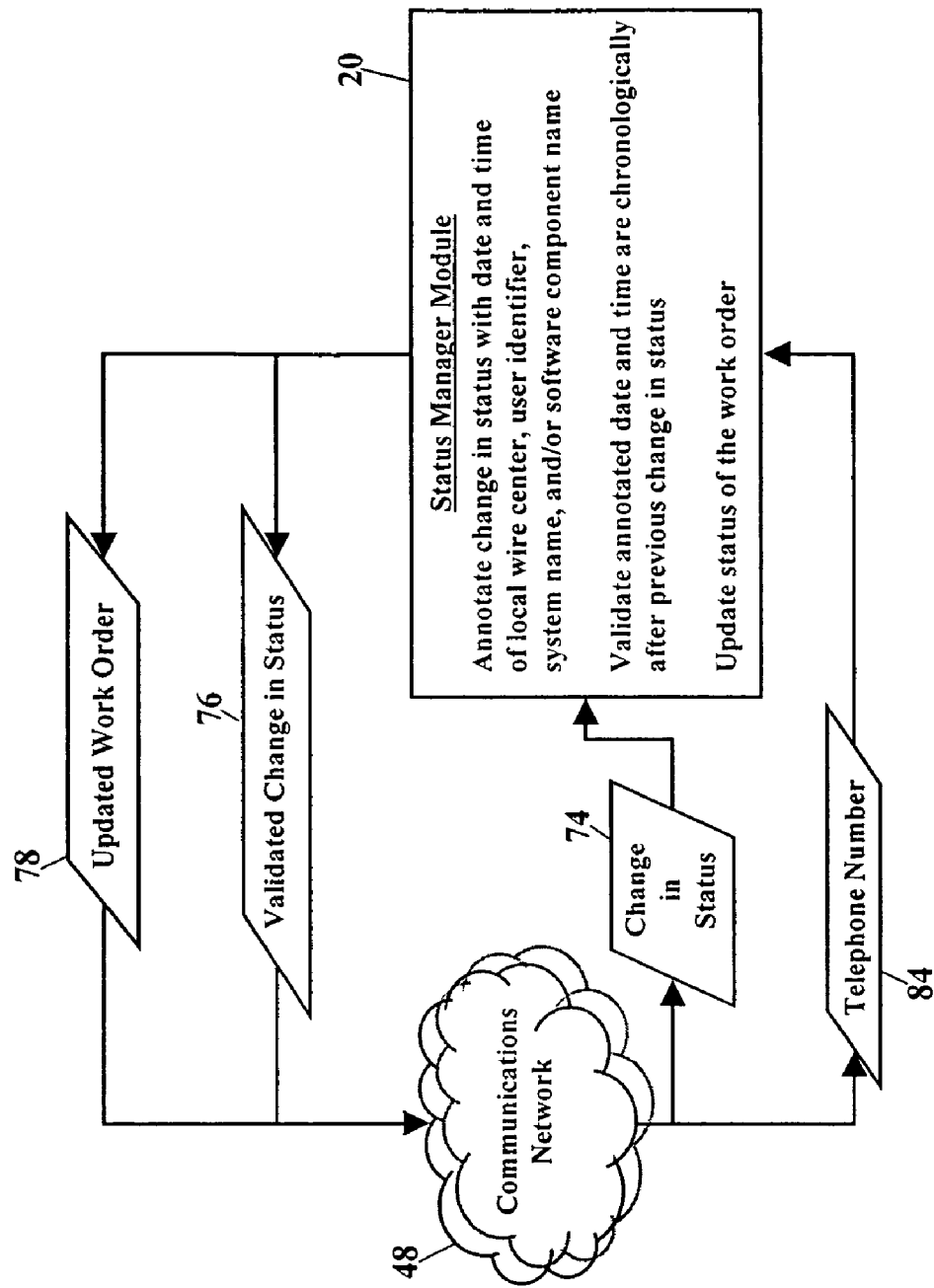
FIG. 5 is a schematic diagram showing a further embodiment of the Status Manager module.

FIG. 5 is a schematic diagram showing a further embodiment of the Status Manager module 20. The Status Manager module 20 communicates with the communications network 48, receives the change in status 74, and annotates the change in status 74 with the date and time. FIG. 5 also shows the Status Manager module 20 may receive a telephone number 84. The Status Manager module 20 uses the telephone number 84 to identify the work order and the change in status 74. Work orders are typically assigned a work order number or a trouble ticket number. FIG. 5 shows, however, that a customer's telephone number 84 would be a logical and simpler identifier. The telephone number 84 is already a unique identifier for a customer. The Status Manager module 20 could associate the change in status 74 with the telephone number 84 and then communicate the validated change in status 76 and/or the updated work order 78. While some client systems may require extra digits appended to the telephone number 84, the simple telephone number 84 could reduce the burden of tracking redundant, identifying numbers.

Figure 6:
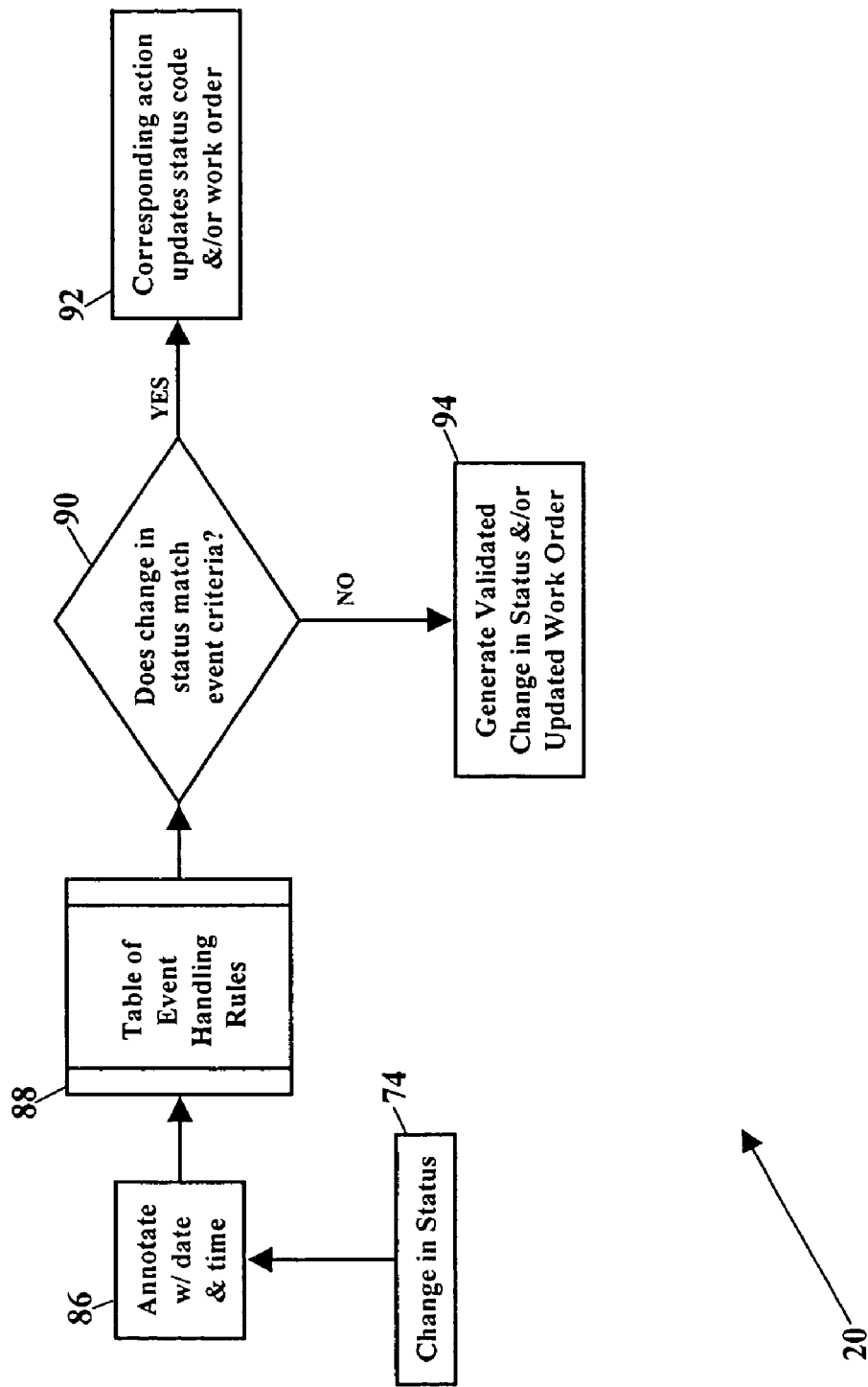
FIG. 6 is a block diagram showing still another embodiment of the Status Manager module.

FIG. 6 is a block diagram showing still another embodiment of the Status Manager module 20. The Status Manager module 20, again, receives the change in status 74 and annotates the date and time (Block 86). As FIG. 6 illustrates, however, the Status Manager module 20 may also include a table 88 of event handling rules. The table 88 of event handling rules contains status events and corresponding actions. As the work order flows from initial creation to final closure, the table 88 of event handling rules allows a user to script how status changes flow through an automated work order management system. If, for example, the change in status 74 has attributes indicating a telephone cable repair is necessary, the user could dynamically configure the table 88 of event handling rules to filter the change in status 74 and assign a cable repair status code. If, similarly, the change in status 74 has attributes indicating a work order is transitioning from dispatch status to technician status, the user could dynamically configure the table 88 of event handling rules to filter the change in status 74 for this transition and then assign a technician status code. The table 88 of event handling rules thus allows a user to define how status changes flow through an automated work order management system. Local users may thus customize the Status Manager module 20 to fit local management desires and constraints.

The table 88 of event handling rules is a tunable, user subset of functionalities. The table 88 of event handling rules allows the user to script events and corresponding actions. If the change in status 74 contains data attributes that match an event criteria (Block 90), then the Status Manager module 20 automatically updates the work order, and/or the change in status 74, according to the corresponding action (Block 92). If, likewise, the work order contains data attributes that match the status event criteria, then the Status Manager module 20 automatically updates the work order, and/or the change in status 74, according to the corresponding action. If the status event criteria is not found, then the Status Manager module 20 generates the validated change in status and/or the updated work order (Block 94) (the validated change in status and the updated work order are shown, respectively, as reference numerals 76 and 78 in FIGS. 3-5).

The table 88 of event handling rules is user-defined. The table 88 of event handling rules allows the user, or a customer purchasing the Status Manager module 20, to tune, or customize, the dynamic flow of work orders. The table 88 of event handling rules also permits users and purchasing customers to tune the flow of work orders without changing the underlying software of the Status Manager module 20. One manager, for example, may feel telephone cable failures should be assigned to inside plant personnel, while another manager may feel the same telephone cable failure should, instead, be assigned to outside plant personnel. Each manager may thus script their own table 88 of event handling rules without expending time and resources altering the underlying software code. The table 88 of event handling rules could simply filter the change in status 74 for a specified status code, for a specified transition, or even for an aged change in status 74. The table 88 of event handling rules could also contain more complex filtering criteria stated in logical expressions. Below is an example of the table 88 of event handling rules:

| Event Criteria | Corresponding Action |
| --- | --- |
| 1) Handle Code = ADSL | Set status = PDZ |
| | Set route = 557 |
| | Set narrative to "Call 555-121-8846 when DPO" |
| 2) Status = AJR and # subs ≧ 2 and LCD ≦ 48 hrs | Set status = ACB |
| | Set route = 298 |
| | Set narrative = "AAJR VER 0 Clear/Close by AJR" |

Figure 7:
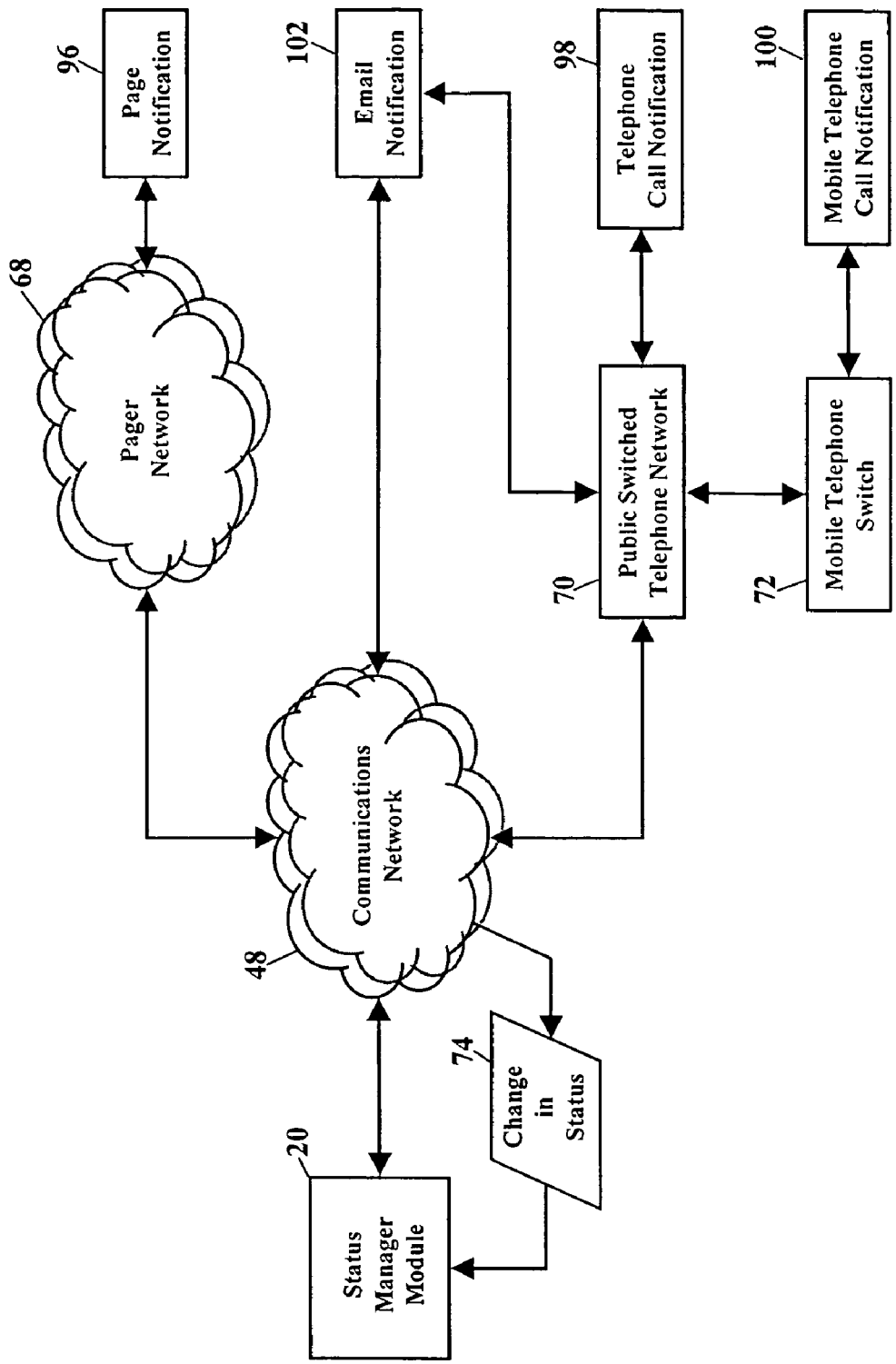
FIG. 7 is a schematic drawing of yet another embodiment of the Status Manager module.

FIG. 7 is a schematic drawing of yet another embodiment of the Status Manager module 20. FIG. 7 shows that the Status Manager module 20 may send various notifications when a certain change in status 74 is detected. The Status Manager module 20, for example, communicates with the communications network 48, and with the pager network 68, to send a page notification 96. The Status Manager module 20 could also be programmed to place a telephone call over the Public Switched Telephone Network 70 and provide a telephone call notification 98. The Status Manager module 20 could similarly access the mobile telephone network 72 through the Public Switched Telephone Network 70. The Status Manager module 20 could call a mobile telephone number and provide a mobile telephone call notification 100. The communications network 48 itself could communicate an email notification 102. The email notification 102 could also be communicated over the Public Switched Telephone Network 70 to the globally-distributed communication network (e.g., the "Internet," shown as reference numeral 58 in FIG. 2).

The Status Manager module 20 could send the notification when a change in status 74 is detected. The table 88 of event handling rules may include an event criteria that correspondingly initiates the notification. The table 88 of event handling rules, for example, could initiate the notification when the change in status 74 updates an intermediate status code. The notification could also be sent when a certain trouble code is detected, or when a certain technician is assigned. The Status Manager module 20 could initiate the notification at any event a user desires.

Figure 8:
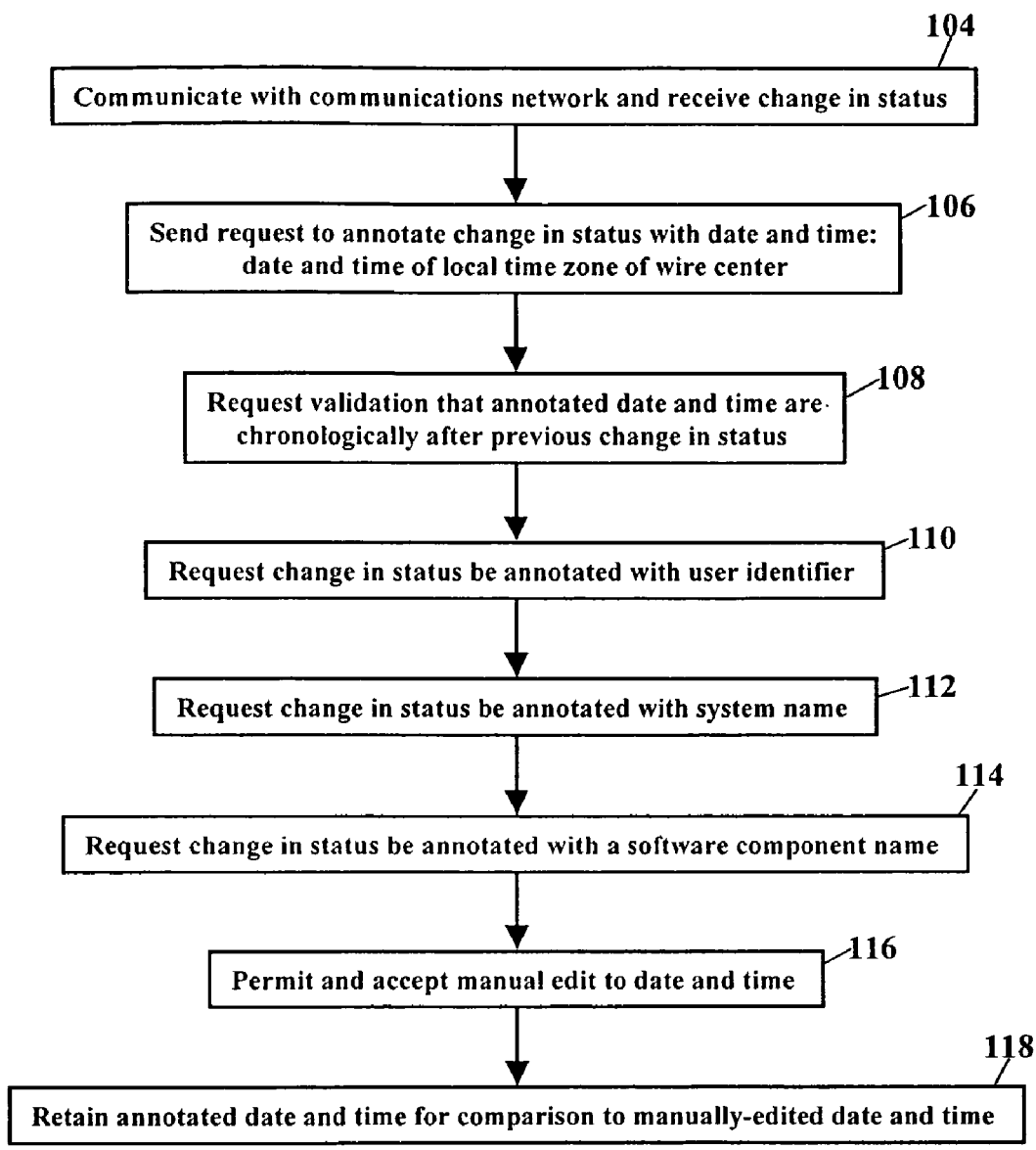
FIGS. 8 and 9 are flowcharts describing a process of managing status changes to a work order.
Figure 9:
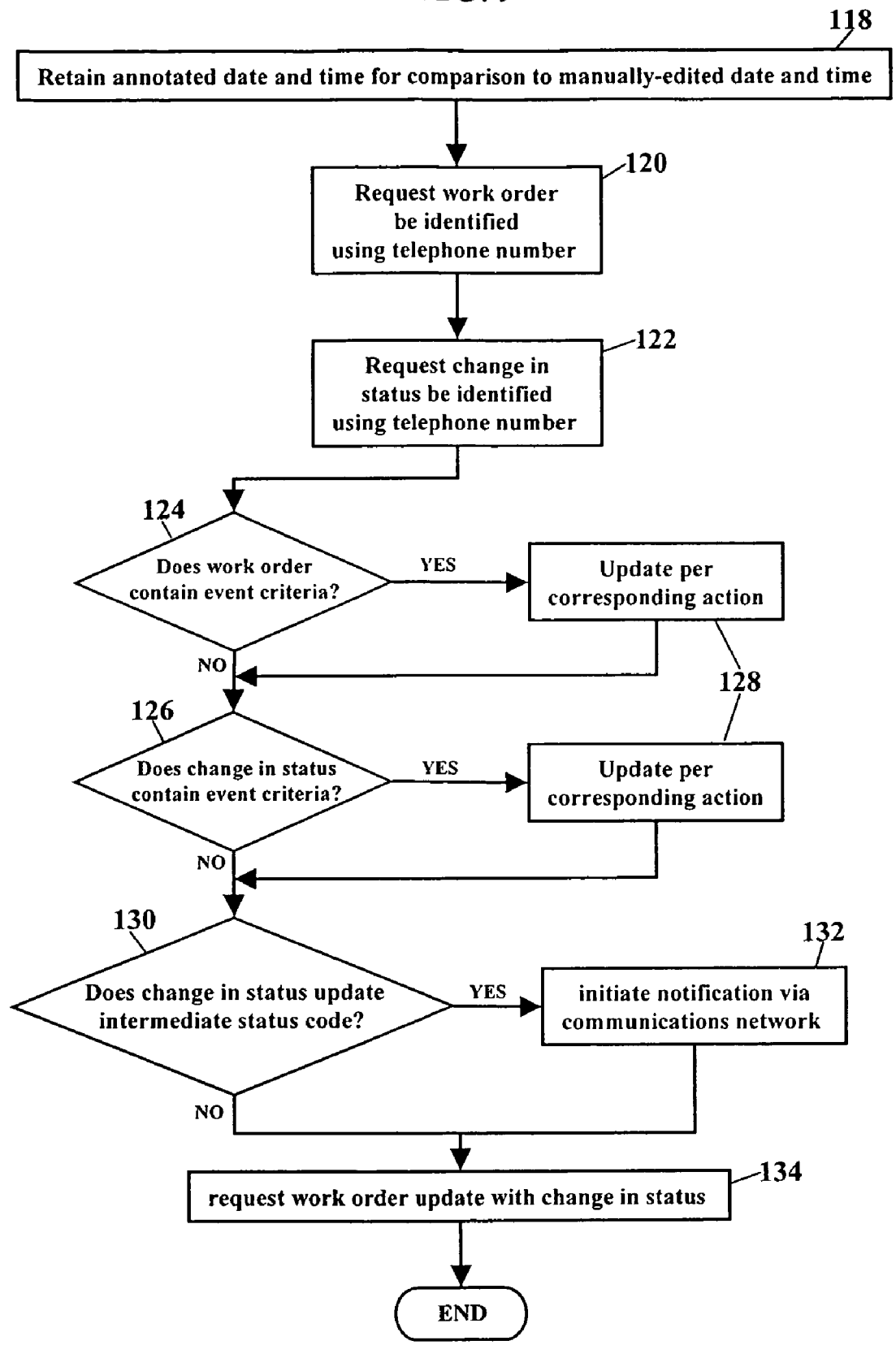

FIGS. 8 and 9 are flowcharts describing a process of managing status changes to a work order. The process communicates with a communications network and receives a change in status for the work order (Block 104). A request is sent to annotate the change in status with a date and a time (Block 106). The date and the time reflect the local time zone of a telephone system wire center where the work order is locally managed. The process requests a validation that the annotated date and the time are chronologically after a previous change in status (Block 108). The process could also request that the change in status be annotated with a user identifier (Block 110), with a system name (Block 112), and/or with a software component name (Block 114). The user identifier represents a user generating the change in status to the work order. The system name represents a system generating the change in status to the work order. The software component name represents a computer software component generating the change in status to the work order. The process could also permit and accept a manual edit to the date and the time (Block 116). The manually edited date and time could permit a user to backdate the change in status. The annotated date and time, however, could be retained for a comparison to the manually-edited date and time (Block 118).

FIG. 9 continues describing the process of managing status changes to a work order. The annotated date and time could be retained for a comparison to the manually-edited date and time (Block 118). The process could request that the work order (Block 120) and/or the change in status (Block 122) be identified using a telephone number. A request could also be sent to filter the work order (Block 124) and/or the change in status (Block 126) for an event criteria. If the event criteria is found, the work order is updated according to a corresponding action (Block 128). If the change in status updates an intermediate status code (Block 130), then a request is sent to initiate a notification via the communications network (Block 132). A request is also sent to update the work order with the change in status (Block 134). Each change in status, therefore, is date and time stamped as the work order progresses from creation to closure.

The Status Manager module (shown as reference numeral 20 in FIGS. 1-6) may be physically embodied on or in a computer-readable medium. This computer-readable medium may include a CD-ROM, DVD, tape, cassette, floppy disk, memory card, and a large-capacity disk (such as IOMEGA® ZIP®, JAZZ®, and other large-capacity memory products) (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer readable media, and other types not mentioned here but considered within the scope of the present invention, allow the Status Manager module to be easily disseminated. A computer program product for managing status changes to a work order has the Status Manager module stored on the computer-readable medium. The Status Manager module acquires a change in status to the work order and annotates the change in status with a date and a time. The date and the time reflect the local time zone of a telephone system wire center where the work order is locally managed. The Status Manager module validates that the annotated date and the time are chronologically after a previous change in status to the work order.

An alternate embodiment of the computer program product is also disclosed. The Status Manager module is again stored on the computer-readable medium. The Status Manager module acquires a telephone line record. The telephone line record has at least one of i) customer information from a Customer Record Information System, ii) facility information from a Loop Facility Assignment Control System, and iii) equipment information from a TELCORDIA™ SWITCH system. The Status Manager module creates the work order using information from the acquired telephone line record. Each change in status to the work order is archived as the work order progresses from creation to closure. Each change in status is also annotated with a date and a time. The date and the time reflect the local time zone of a telephone system wire center where the work order is locally managed. The Status Manager module validates that the annotated date and the time are chronologically after a previous change in status to the work order. The work order is then updated with the change in status.

EXAMPLE

Figure 10:
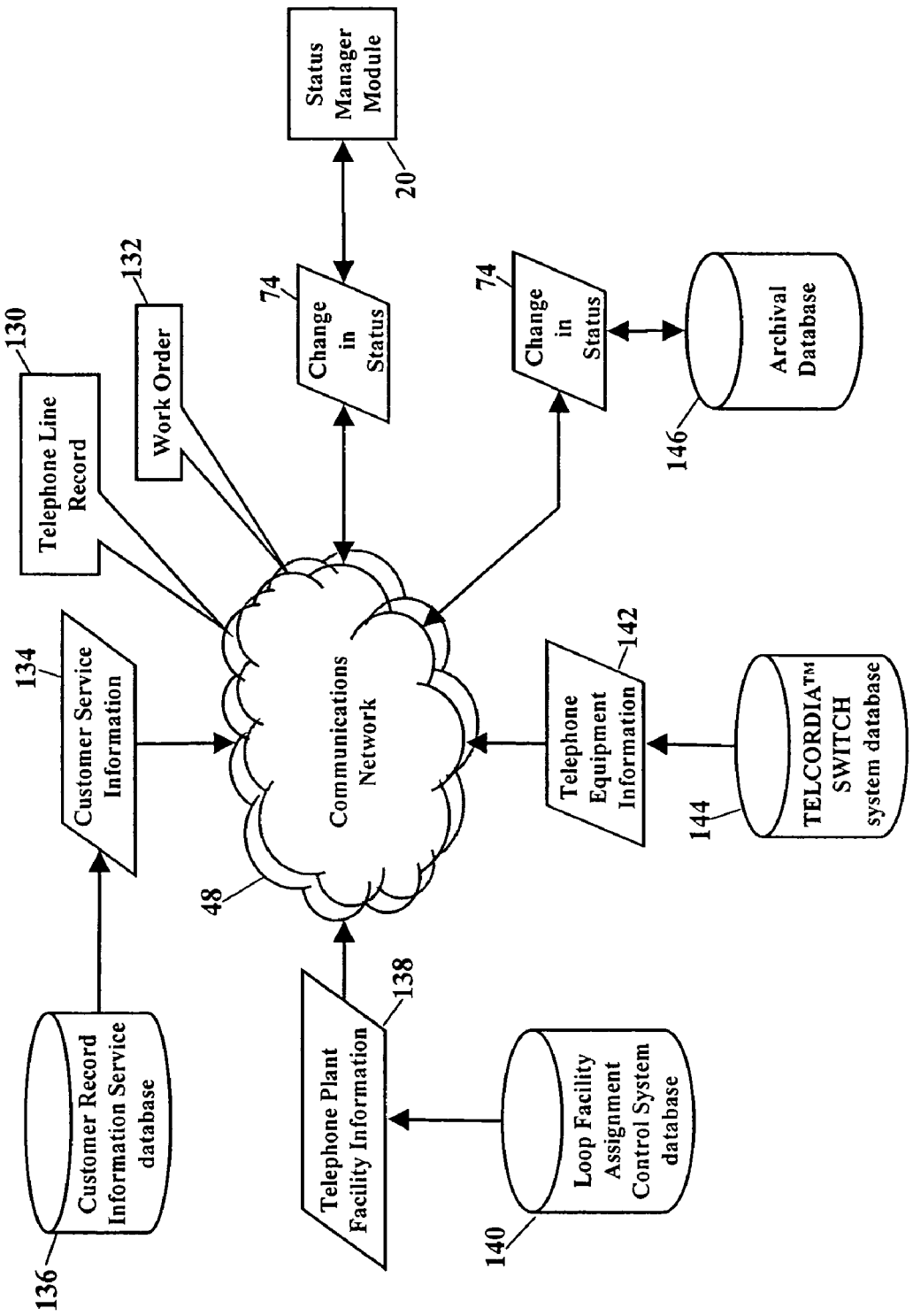

The Status Manager module 20 is further illustrated by the following non-limiting example. FIGS. 10 and 11 are schematic drawings of this non-limiting example. Here the Status Manager module 20 acquires the change in status 74 from several different sources. The change in status 74 could be directly acquired from the communications network 48. The Status Manager module 20 could also extract the change in status 74 from a telephone line record 130. The Status Manager module 20 may also acquire the change in status 74 from a work order 132. Both the telephone line record 130, and the work order 132, would be communicated along, and acquired from, the communications network 48. The telephone line record 130 is assembled from at least one of i) customer information 134 from a Customer Record Information System 136, ii) facility information 138 from a Loop Facility Assignment Control System 140, and iii) telephone equipment information 142 from a switch system 144. Although the switch system is preferably the TELCORDIA™ SWITCH® system, other switching systems and products are suitable. The work order 132, too, is constructed using information from the telephone line record 130. The assembly of the telephone line record 130 is more fully shown and described in U.S. application Ser. No. 09/946,405, filed concurrently herewith, entitled METHODS AND SYSTEMS FOR ASSEMBLING TELEPHONE LINE RECORDS, and incorporated herein by reference in its entirety. However the change in status 74 is acquired, each change in status 74 is archived in an archival database 146. Each change in status 74 is thus tracked and logged as the work order 132 progresses from creation to closure.

FIG. 11 further describes the non-limiting example. FIG. 11 shows that the change in status 74 may be acquired from even more information than that shown in FIG. 10. The change in status 74 may include information from many other portions and subsystems within the communications system. The change in status 74, for example, may include information from a mechanized loop test 148 or other automated local loop test 150. The change in status 74 could also include information from a digital subscriber line communication system 152, information from a fiber optic communication system 154, and information from an Integrated Services Digital Network communication system 156. The change in status 74 may thus include information from all facets and from all portions of the communications system.

Once the change in status 74 is acquired, the non-limiting example operates as previously discussed. Each change in status 74 is annotated with a date and a time (as shown and discussed with reference to FIG. 3). Each change in status 74 could also be annotated with the user identifier, the system name, and the software component name (as FIG. 3 also shows). A user may manually edit the date and time to back-date the change in status 76, and the annotated date and time, and the manually-edited date and time, are retained and validated (as both FIGS. 3 and 4 describe). Both the change in status 74 and the work order (shown as reference numeral 132 in FIG. 10) may be identified using the telephone number (shown and discussed as reference numeral 84 in FIG. 5). Both the change in status 74 and the work order could also be filtered for the event criteria, and then updated using the corresponding action (as FIG. 6, and the accompanying discussion, illustrate). The notification could also be initiated when a certain change in status 74 is detected (as FIG. 7 explains). Each change in status 74 in the life of the work order is thus tracked and logged for management, reporting, and auditing activities.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

The invention claimed is:

1. A computer-implemented process of managing status changes to a work order for management reporting, and auditing activities of work order performance in a telephone facility network, the process comprising:

configuring, in a computer memory, a table of local user defined event handling rules including status change event rules wherein each status change event rule indicates one or more actions to be performed on a work order for at least one status transition resulting from a change-in-status in the performance of a work order;

acquiring, from a communications network, a telephone line record from at least one of i) results from a mechanized loop test, ii) results from an automated local loop test system, iii) information from a digital subscriber line communication system, iv) information from a fiber optic communication system, and v) information from an Integrated Services Digital Network communication system, the telephone line record comprising at least one of i) customer information from a Customer Record Information System, ii) facility information from a Loop Facility Assignment Control System, and iii) equipment information from a switch system; creating a work order using information from the acquired telephone line record and assigning the work order an initial status;

receiving, from a communications network, work order change-in-status information wherein said change-in-status information includes a work order identifier, a status code, and a generating identifier; annotating the change-in-status information with a date and a time reflecting the local time zone of a telephone system wire center where the work order is locally managed;

validating that the annotated date and the time are chronologically after a previous change in status to the work order; updating the work order with the change in status; and archiving each change in status to the work order as the work order progresses from creation to closure;

filtering the table of event handling rules for the work order change-in-status information for an event criteria, the event criteria specifying a status transition matching one or more event handling rules, wherein the work order is automatically updated according to the corresponding actions of the one or more event handling rules, wherein at least one of the one or more event handling rules includes a corresponding action to set the status of the work order to a specified status code based on the change-in-status information and corresponding action of the event handling rules; and providing a notification, via a communications network, of the transition to the specified status based on the change-in-status information;

wherein each transition in status in the life of the work order is tracked and logged for management, reporting, and auditing activities.

2. A process of managing status changes to a work order according to claim 1, where the generating identifier is a user identifier representing a user generating the change in status of the work order.

3. A process of managing status changes to a work order according to claim 1, where the generating identifier is a system name representing a system generating the change in status of the work order.

4. A process of managing status changes to a work order according to claim 1, where the generating identifier is a software component name representing a computer software component generating the change in status of the work order.

5. A process of managing status changes to a work order according to claim 1, further comprising manually editing the date and the time to permit a user to backdate the change in status.

6. A process of managing status changes to a work order according to claim 5, further comprising retaining the annotated date and time for a comparison to the manually-edited date and time.

7. A process of managing status changes to a work order according to claim 1, further comprising identifying the work order using a telephone number.

8. A process of managing status changes to a work order according to claim 1, further comprising identifying the change in status information using a telephone number.

9. A process of managing status changes to a work order according to claim 1, further comprising communicating a notification, via the communications network, when the change in status updates the work order to an intermediate status code.

10. A system for managing status changes to a work order for management, reporting, and auditing activities of work order performance in a telephone facility network, the system comprising
a computer and a memory comprising
a Status Manager module operable to:
configure, in a computer memory, a table of local user defined event handling rules including status change event rules wherein each status change event rule indicates one or more actions to be performed on a work order for at least one status transition resulting from a change-in-status in the performance of a work order;
acquire, from a communications network, a telephone line record from at least one of i) results from a mechanized loop test, ii) results from an automated local loop test system, iii) information from a digital subscriber line communication system, iv) information from a fiber optic communication system, and v) information from an Integrated Services Digital Network communication system, the telephone line record comprising at least one of i) customer information from a Customer Record Information System, ii) facility information from a Loop Facility Assignment Control System, and iii) equipment information from a switch system; create the work order using information from the acquired telephone line record and assign the work order an initial status;
receive, from a communications network, work order change-in-status information wherein said change-in-status information includes a work order identifier, a status code, and a generating identifier;
annotate the change-in-status information with a date and a time reflecting the local time zone of a telephone system wire center where the work order is locally managed;
validate that the annotated date and the time are chronologically after a previous change in status to the work order; update the work order with the change in status; and archive each change in status to the work order as the work order progresses from creation to closure;
filter the table of event handling rules for the work order the change-in-status for an event criteria, the event criteria specifying a status transition matching one or more event handling rules, wherein the work order is automatically updated according to the corresponding actions of the one or more event handling rules, wherein at least one of the one or more event handling rules includes a corresponding action to set the status of the work order to a specified status code based on the change-in-status information and corresponding action of the event handling rules; and
provide a notification, via a communications network, of the transition to the specified status based on the change-in-status information;
wherein each change in status in the life of the work order is tracked and logged for management, reporting, and auditing activities.

11. A computer program product for managing status changes to a work order for management, reporting, and auditing activities of work order performance in a telephone facility network, the computer program product comprising:
a computer-readable medium; and
a Status Manager module stored on the computer-readable medium, the Status Manager module operable to:
configure, in a computer memory, a table of local user defined event handling rules including status change event rules wherein each status change event rule indicates one or more actions to be performed on a work order for at least one status transition resulting from a change-in-status in the performance of a work order;
acquire, from a communications network, a telephone line record from at least one of i) results from a mechanized loop test, ii) results from an automated local loop test system, iii) information from a digital subscriber line communication system, iv) information from a fiber optic communication system, and v) information from an Integrated Services Digital Network communication system, the telephone line record comprising at least one of i) customer information from a Customer Record Information System, ii) facility information from a Loop Facility Assignment Control System, and iii) equipment information from a switch system; create the work order using information from the acquired telephone line record and assign the work order an initial status;
receive, from a communications network, work order change-in-status information wherein said change-in-status information includes a work order identifier, a status code, and a generating identifier;
annotate the change-in-status information with a date and a time, reflecting the local time zone of a telephone system wire center where the work order is locally managed;
validate that the annotated date and the time are chronologically after a previous change in status to the work order; update the work order with the change in status; and archive each change in status to the work order as the work order progresses from creation to closure;

filter the table of event handling rules for the work order the change-in-status for an event criteria, the event criteria specifying a status transition matching one or more event handling rule, wherein the work order is automatically updated according to the corresponding actions of the one or more event handling rules, wherein at least one of the one or more event handling rules includes a corresponding action to set the status of the work order to a specified status code based on the change-in-status information and corresponding action of the event handling rules; and provide a notification, via a communications network, of the transition to the specified status based on the change-in-status information;

wherein each change in status in the life of the work order is tracked and logged for management, reporting, and auditing activities.

\* \* \* \* \*